United States Patent [19]
Nakano et al.

[11] Patent Number: 5,235,653
[45] Date of Patent: Aug. 10, 1993

[54] DOCUMENT ANALYSIS SYSTEM

[75] Inventors: Yasuaki Nakano, Hino; Hiromichi Fujisawa, Tokorozawa; Kunihiro Okada; Osamu Kunisaki, both of Yokohama; Toshitsugu Ozaki, Kanagawa, all of Japan

[73] Assignee: Hitachi, Ltd., Tokyo, Japan

[21] Appl. No.: 845,838

[22] Filed: Mar. 6, 1992

Related U.S. Application Data

[63] Continuation of Ser. No. 485,986, Feb. 27, 1990, abandoned, which is a continuation of Ser. No. 399,411, Aug. 25, 1989, Pat. No. 4,933,984, which is a continuation of Ser. No. 178,768, Mar. 29, 1988, abandoned, which is a continuation of Ser. No. 766,943, Aug. 19, 1985, abandoned.

[30] Foreign Application Priority Data

Aug. 31, 1984 [JP] Japan .............................. 59-180517

[51] Int. Cl.⁵ .............................................. G06K 9/20
[52] U.S. Cl. ........................................ 382/61; 382/48
[58] Field of Search ................... 382/9, 14, 15, 22, 25, 382/30, 33, 36, 37, 39, 40, 48, 57, 61; 358/462, 464, 467; 235/435, 436, 117, 144, 145, 146, 147, 149, 155, 156, 157, 148

[56] References Cited

U.S. PATENT DOCUMENTS

| | | | |
|---|---|---|---|
| 4,408,181 | 10/1983 | Nakayama | 382/61 |
| 4,516,265 | 5/1985 | Kizu et al. | 382/48 |
| 4,907,285 | 3/1990 | Nakano et al. | 382/48 |
| 4,933,984 | 6/1990 | Nakano et al. | 382/48 |

*Primary Examiner*—Jose L. Couso
*Attorney, Agent, or Firm*—Antonelli, Terry, Stout & Kraus

[57] ABSTRACT

A document analysis system for determining format information of a document, wherein frames and a relationship of the frames are extracted from an image of an unmarked sample document, characters in a frame of the document are recognized, and an image structure is analyzed based on the frame and the recognized characters.

15 Claims, 7 Drawing Sheets

FIG. 3(A)
APPLICATION FORM
| APPLI-CANT | |
| HOME ADDRESS | |
| | |
| REPRE-SENTATIVE | |
| DATE | |
I APPLY AS DESCRIBED ABOVE
FIG. 3(B)
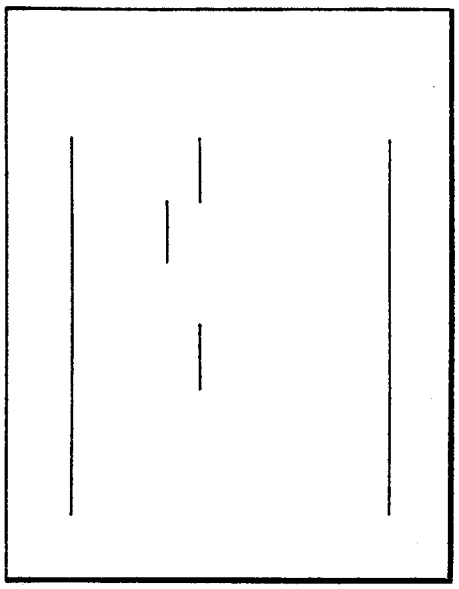
FIG. 3(C)
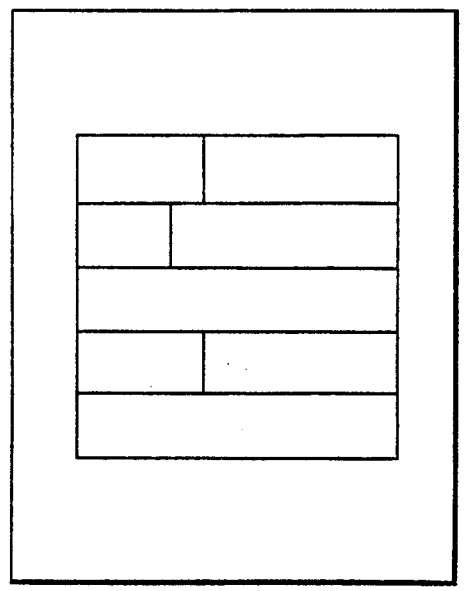
FIG. 3(D)

DOCUMENT ANALYSIS SYSTEM

This application is a continuation of application Ser. No. 485,986, filed on Feb. 27, 1990 now abandoned which is a continuation of application Ser. No. 399,411 filed Aug. 25, 1989 now U.S. Pat. No. 4,933,984 which is a continuation of application Ser. No. 178,768 filed Mar. 29, 1988 now abandoned which is a continuation of application Ser. No. 766,943 filed Aug. 19, 1985, now abandoned.

BACKGROUND OF THE INVENTION

The present invention relates to a document processing system, and more particularly to a document processing system suitable for reading characters or a document of a tabular form.

In a prior art optical character reader (OCR), it is necessary to print a read region in a color undetectable by the OCR (dropout color) and hence a print cost is raised. Further, in using the OCR, it is necessary to indicate the character read region by a distance from an edge of the document and designate the number of characters in the region, a character set and check formula. This is troublesome. The positional information of the character read region, the number of characters in the region, the character set and check formula are called format information. The character recognition function is required not only in a standalone OCR but also in a document file and an office automation (OA) workstation, but the above problems have been blocked a wide use thereof.

Japanese Patent Unexamined Publication No. 58-207184 (published on Dec. 2, 1983) discloses a method to eliminate a fixed pattern stored in a memory from an input image, and a method for discriminating a type of document by using the fixed pattern. In this method, however, a memory capacity increases because the image is stored in the memory, and distortion of document (warping, rotation or positional shift) cannot be exactly compensated.

SUMMARY OF THE INVENTION

It is an object of the present invention to provide means for automatically recognizing a structure of an, input document to generate a document format so that the range of documents which can be processed is widened and format information preparation is simplified.

It is another object of the present invention to provide means for automatically identifying a type of input fixed format to enable reading without human intervention of fixed form documents of different kinds by using prestored format information.

In order to achieve the above objects, in accordance with the present invention, frames and a relationship between the frames are extracted from an image of an unmarked document (sample document) of the same type as a document to be identified, and characters in the frames of the document to be identified are recognized and a structure of the image is recognized based on the frames and the recognized characters so that the format information of the document to be identified is determined.

DESCRIPTION OF THE PREFERRED EMBODIMENTS

Figure 1:
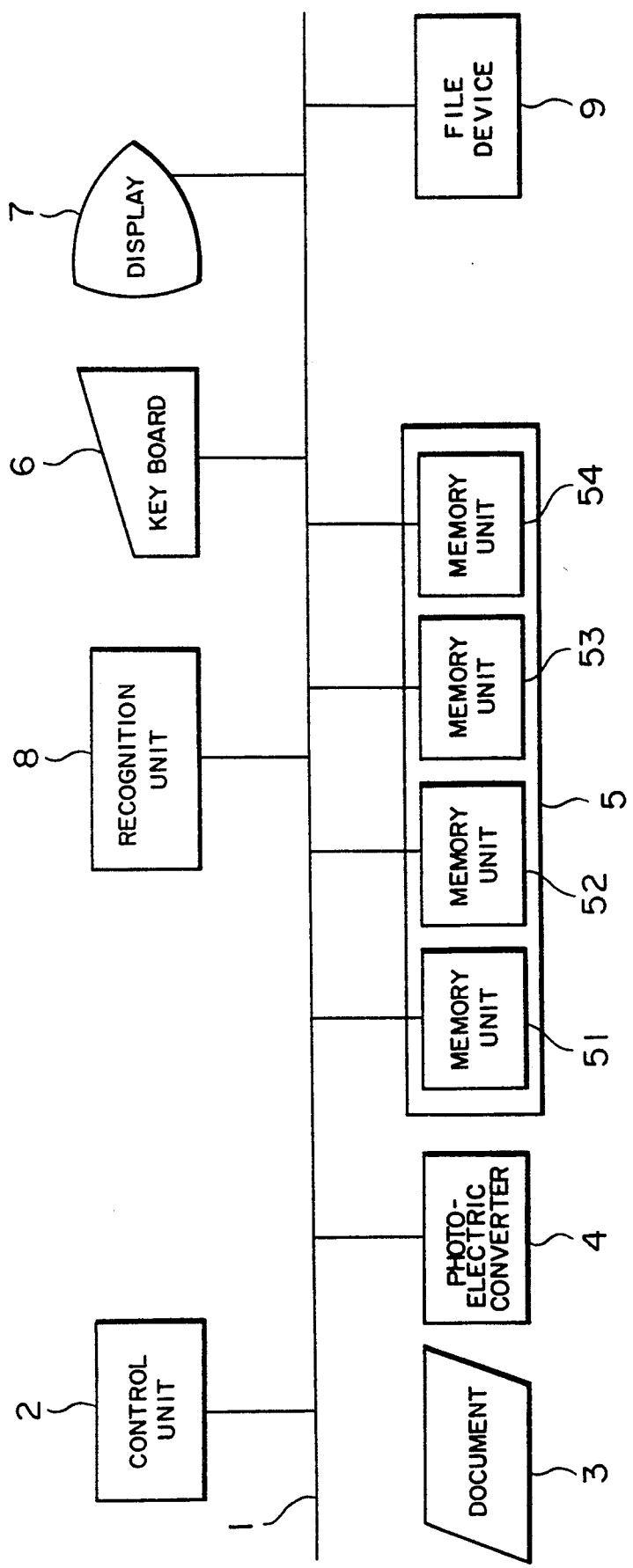
FIG. 1 shows an embodiment of the present invention.

FIG. 1 is a block diagram of one embodiment of a document recognition system of the present invention. Units of the system are connected to a bus 1 and an overall operation is controlled by a control unit 2. Information (document image) on a document 3 is scanned by a photo-electric converter 4 and digitized and the digitized information is stored in a memory 51 through the bus 1. The memory 51 together with memories 52, 53 and 54 form a memory 5. The information may be digitized by a high efficiency encoding method to save memory capacity of the memory in which the document image is stored. In the following description, the information is digitized by one bit per pixel although each pixel may be represented by multiple bits or the image may be photo-electically converted by a color scanner with color information being added.

Figure 2:
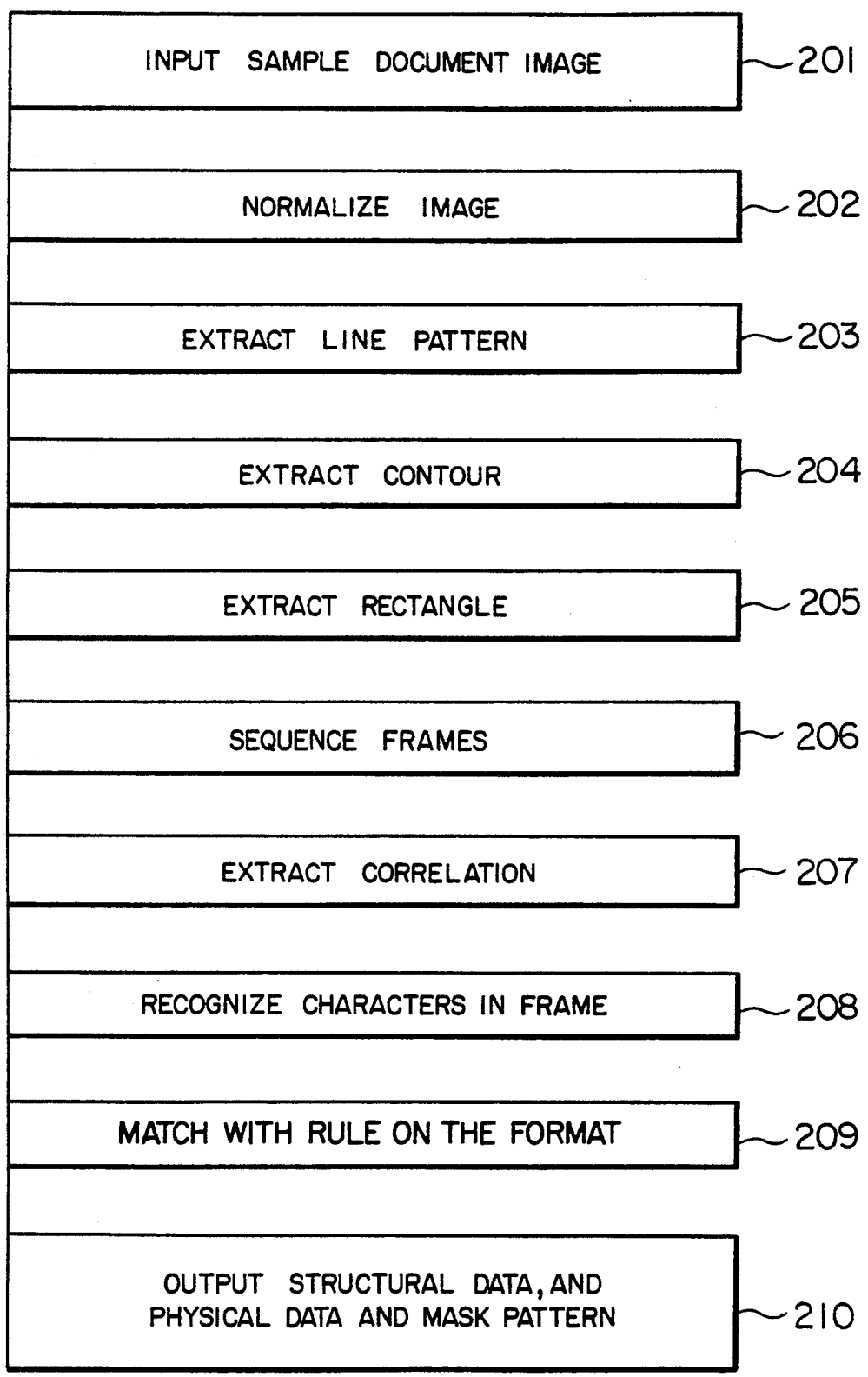
FIGS. 2, 4, 6 and 7 are flow charts for illustrating processing in a control unit of FIG. 1, FIGS. 3 and 5 show processing in FIG. 2.

The document processing includes a registration mode and recognition mode. These modes are selected by man-machine communications through the control unit 2, a keyboard 6 and a display 7. The registration mode will be first explained as follows. FIG. 2 shows a flow chart in the registration mode. It is carried out by a computer program in the control unit 2. In FIG. 2, a sample document image is inputted in step 201. One sample document is prepared for each type of document. An image on the sample document is stored in the memory 51. In step 202, the sample document image is normalized such as position correction or rotation correction, and a resulting image is stored in the memory 52. In step 203, a line pattern is extracted from the normalized image and stored in the memory 53. FIG. 3 illustrates the line pattern extraction processing. FIG. 3(A) shows an input image. A horizontal line pattern shown in FIG. 3(B) is extracted from the input image, a vertical line pattern shown in FIG. 3(C) is extracted from the input image, and the patterns of FIGS. 3(B) and 3(C) are logically ORed to produce the line pattern shown in FIG. 3(D). Detail of the line pattern extraction processing will be explained later. In a step 204, a sequence of coordinates of a contour are extracted from the line pattern. The sequence of coordinates include as many pairs of coordinates the number of line segments making up each contour. In the present embodiment, only inner contours are processed. The inner contour is defined as a black pixel boundary which surrounds a white pixel are in the clockwise direction while around the periphery of the white pixel area. In a step 205, a rectangular area is extracted from the inner contours. Discrimination of the rectangular area will be described later. The rectangular inner contour is called a frame. In a step 206, the sequence of the frames are rearranged by using the four-corner coordinates of the frames. In a step 207, correlation codes Cmn between a frame m and a frame n are extracted. Correlation codes are used to define a spatial relationship of one frame with respect to another frame as explained below. A particular numerical value of a correlation code spatially defines a particular spatial relationship of one frame with respect to another. A suitable program may be written to analyze the defined spatial relationship of respective frames to determine which of the spatial relationships set forth below is satisfied. The correlation code Cmn is defined as follows.

```
Cmn = 0:  None of the following conditions is met.
    = 1:  m includes n.
    = -1: n includes m.
    = 2:  m is immediately above n.
    = -2: m is immediately below n.
    = 3:  m is immediately on the left of n.
    = -3: m is immediately on the right of n.
    = 4:  m is above n.
    = -4: m is below n.
    = 5:  m is on the left of n.
    = -5: m is on the right of n.
```

In a step 208, an image in the frame is extracted from the original image and it is sequentially sent to a character recognition unit 8 for recognizing characters in the frame. Since only the image in the frame is sent to the character recognition unit 8, the character recognition is not disturbed by a table frame of a non-dropout color or an undesired area outside of the frame. Further, since the rectangular field is used, segmentation and recognition of the characters are facilitated. After all characters in the frames have been recognized, the number Nm of characters recognized in the frame m, a character string Km and the correlation code Cmn are compared with a rule on the format base on a structure of the document in a step 209 in order to recognize the structure of the input document. The rule on the format is expressed in "if~then~" rule, that is, by premises and conclusion. Examples of the rule on the format are shown below, where a, b and c indicate frame numbers.

| | | |
|---|---|---|
| 1. (Premises) | Ka = "application form" | |
| (Conclusion) | Frame a is an item frame. | |
| | Item name of frame a = "application form" | |
| 2. (Premises) | Na = 0 & | |
| | Kb = "applicant" & | |
| | Cab = -3 | |
| (Conclusion) | Frame a is a data frame dependent on frame b. | |
| | Property of frame a = "name". | |
| | (Na = indicates a blank) | |
| 3. (Premises) | Na = 0 & | |
| | Kb = "location" & | |
| | Cab = -4 | |
| | Kc = "home address " & | |
| | Cac = -3 | |
| (Conclusion) | Frame a is a data frame dependent on frames b and c. | |
| | Property of frame a = "address, location". | |
| 4. (premises) | Ka = "year-month-day" | |
| (Conclusion) | Frame a is an independent data frame. | |
| | Item name of frame a = "date". | |
| | Unit name of frame a = "year-month-day" | |
| | Property of frame a = "time: year-month-day date". | |
| 5. (Premises) | Na = 0 | |
| (Conclusion) | Frame a is an independent item data frame. | |
| | Item name of frame a = "miscellaneous". | |
| | Property of frame a = "miscellaneous". | |

The item frame is an index frame on which no data is usually entered. The data frame is a frame on which characters (character string) representing the content of the item are to be entered. The property is the type of characters to be entered in the frame or a constraint thereof. An implementation of the rule on the format is a subroutine represented by the "if~then~" sentence.

The comparison with the rule on the format is done by substituting a and b with m and n, checking if the premises are met and applying the result as an argument. If the premises are met, the conclusion is also applied as an argument. For example, if the frame numbers m and n which correspond to a and b of the premise 1 are found, the frame number a of the conclusion is substituted with m and the result is registered as a structural data of the input document. The structural data consists of the frame correlation code, type of frame (item frame, data frame or both), dependency, item name and property code. If a plurality of rules on the format correspond, the knowledge of the first match may be selected. By setting a default processing (5 in the above example) for a lowest priority rule on the format, the structures of all of the frames can be determined. As all frames have been compared with the rule on the format and the structures thereof have been determined, the registration of the structural data is terminated, and the structural data is terminated, and the structural data, physical data of the frames (four-corner coordinates of the frames) and mask pattern are sent to an output unit 9. The mask pattern is used to erase characters preprinted in the data frame (unit name such as year-month-day in 4 above). The mask pattern(s) is a rectangle that envelopes each preprinted character and is used for deleting characters and recognizing only numerals so as to carry out recognition easily. The mask pattern is changed in accordance with the number and size of characters to be masked. The coordinates of the rectangle can be calculated from each outer contour included in the frame, by detecting the maxima and minia of X and Y coordinates of the points on the contour. To avoid a malfunction caused by the variation of preprinted characters in various environments, it is efficient to enlarge the rectangles a little, i.e. to add a small parameter to the maximal values detected by the said manner and to subtract a small parameter from the minimal values. The structural data, physical data of the frame and mask pattern correspond to the format data in the conventional OCR. An identification number and a file name of the input document are also entered by the keyboard 6 and the display 7.

Figure 4:
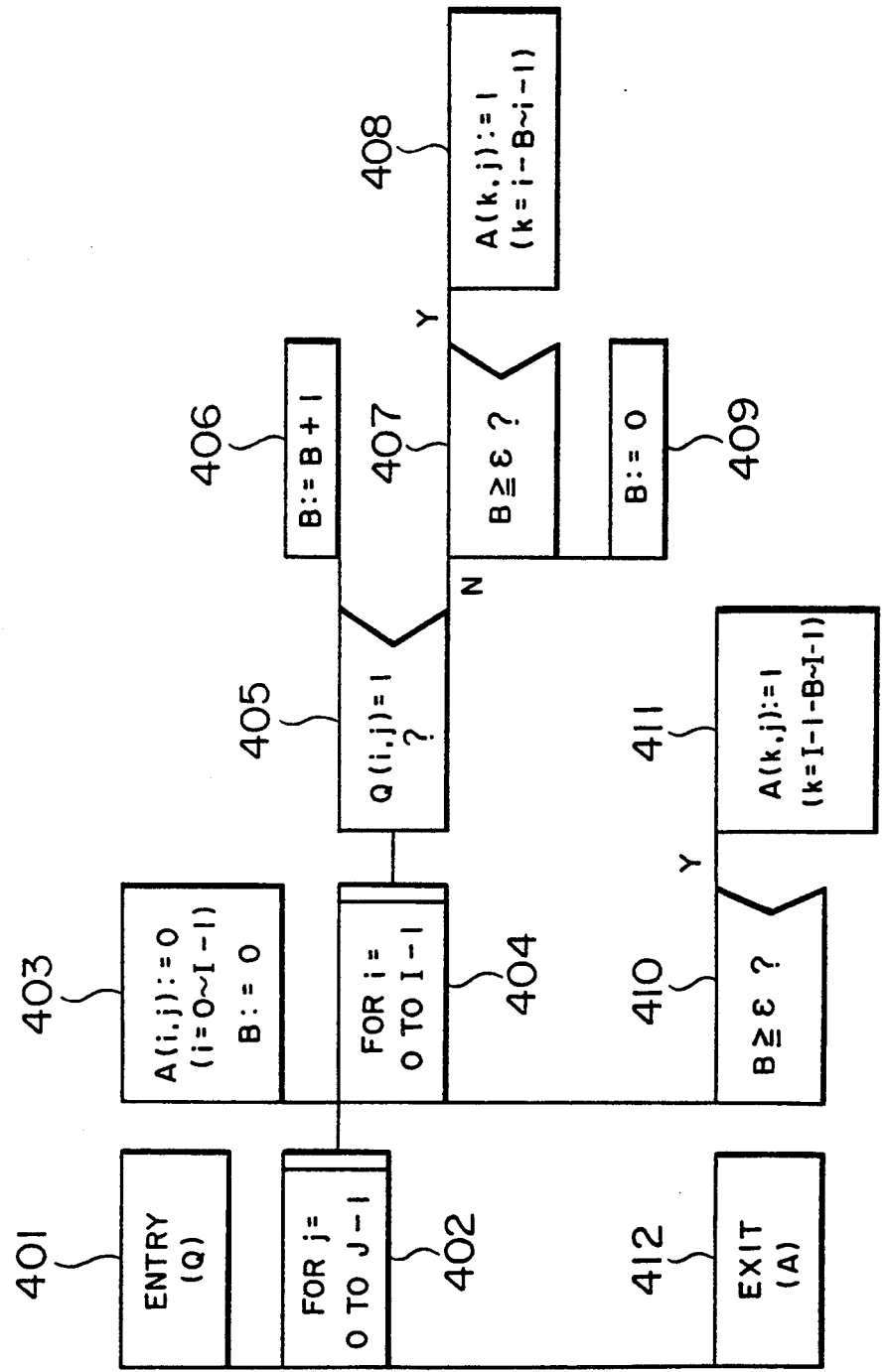

The line pattern extraction processing will now be explained in detail. FIG. 4 is a PAD (problem analysis diagram) flow chart of the line pattern extraction processing. The line pattern extraction includes horizontal line extraction and vertical line extraction. Only the horizontal line extraction will be explained here and the vertical line extraction will not be explained because it is similar to the horizontal line extraction. In FIG. 4, a step 401 is an entry to the line extraction. The normalized image Q stored in the memory 52 is read out. The image Q is expressed as two-dimensional data $$Q(i,j) i=0 \sim I-1, j=0 \sim J-1$$

as shown in FIG. 3(A) In step 402 steps 403–409 are repeated for each scan line number j to produce a two-dimensional pattern A (i, j) as shown in FIG. 3(B). The step 403 is an initialization step in which A(i, j) is reset to 0 and B is reset to 0. The step 404 is an iterative loop in which the step is repeated by the number I of pixels in the scan line. The step 405 checks if Q (i, j) is "1" or "0". If it is "1", a run length B of the black pixels is incremented in the step 406. If Q (i, j) is 0, the run length B up to the previous pixel is compared with a threshold e in the step 407. If B is larger, the B pixels defined by $$A(i-B, j) \sim A(i-1, j)$$

are set to "1" (black) in the step 408, and the run length B is reset to 0 in the step 409. In steps 410 and 411, the same processing as the steps 407–408 is carried out. These two steps are added to remedy the missing of a line extraction when the last (rightmost) picture element Q (I, j) is 1. In this case, the condition in step 405 holds, and the line pattern corresponding to the last picture elements, i.e. Q(I − 1 − B, j) − Q(I, j) is not generated because the steps 407–409 are not executed. By the addition of the decision step 407, the line extraction is carried out only when a sufficiently long black horizontal line exists but the characters and symbols printed on the document are not extracted because they are composed of short lines. A step 412 is an exit of the processing. The pattern A (i, j) is stored in the memory 53. As seen from the above, the pattern A (i, j) reflects the presence of the line.

Figure 5:
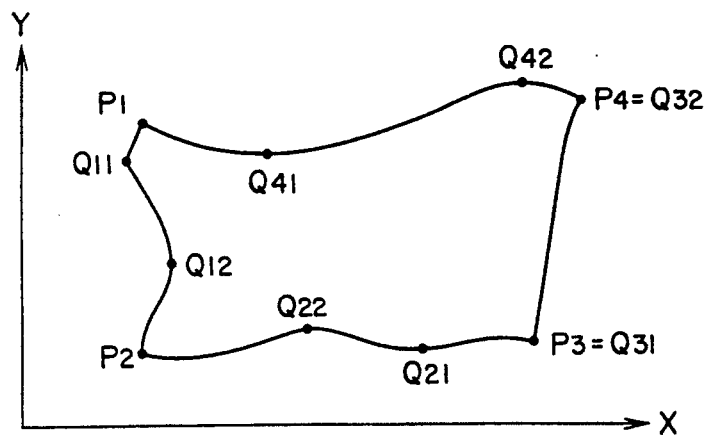

The rectangle extraction processing will now be explained in detail. FIG. 5 shows the rectangle extraction processing. The coordinates of the inner contour are represented by one-dimensional data X (i), Y (i). P4, P2, P3 and P1 in FIG. 5 correspond to points at which $(X(i)+Y(i))$ is maximum and minimum, and $(X(i)-Y(i))$ is maximum and minimum, respectively. The points P1–P4 correspond to four corners when the frame is rectangular. Q12 and Q11 correspond to points at which X is maximum and minimum, respectively, between P1 and P2. Q22 and Q21 correspond to points at which Y is maximum and minimum, respectively, between P2 and P3. The same is true for other sides of the rectangle. If differences between the X-ordinates of the four points P1, Q11, Q12 and P2 are small, P1–P2 is determined to be a straight line. The same determination is made for other three sides and if four sides are straight lines, the frame is determined to be a rectangle.

Figure 6:
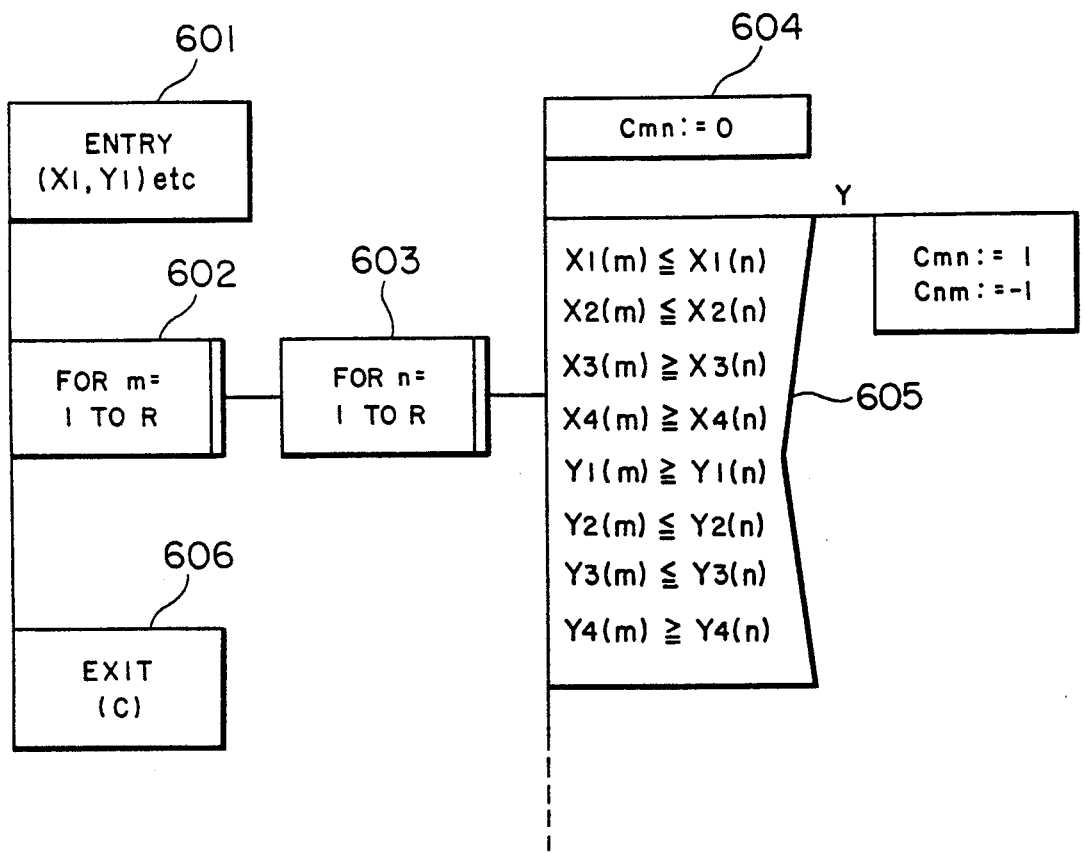

The correlation code extraction processing will now be explained in detail. FIG. 6 is a PAD flow chart of the correlation code extraction processing. A step 601 is an entry step in which the coordinates of four corners of the frame are read out of the memory 52. The four corners of the frame m are expressed by $$(X1 (m), Y1 (m)) (X4 (m), Y4 (m))$$

Steps 602 and 603 are double loops for the frame numbers m and n. In a step 604, Cmn is set to an initial value "0". In a step 605, whether the frame m includes n or not is checked, and if it includes, Cmn is substituted by "1" and Cnm is substituted by "−1". The other correlation codes are determined in the same manner. A step 606 is an exit step in which a matrix C of the correlation codes is outputted. The processing to determine the condition codes is the same as explained for step 207 of FIG. 2.

The registration mode has thus been explained. The registration mode is previously carried out and the format information such as structural data are stored. Alternatively, it may be integrated with the recognition mode to be described below.

Figure 7:
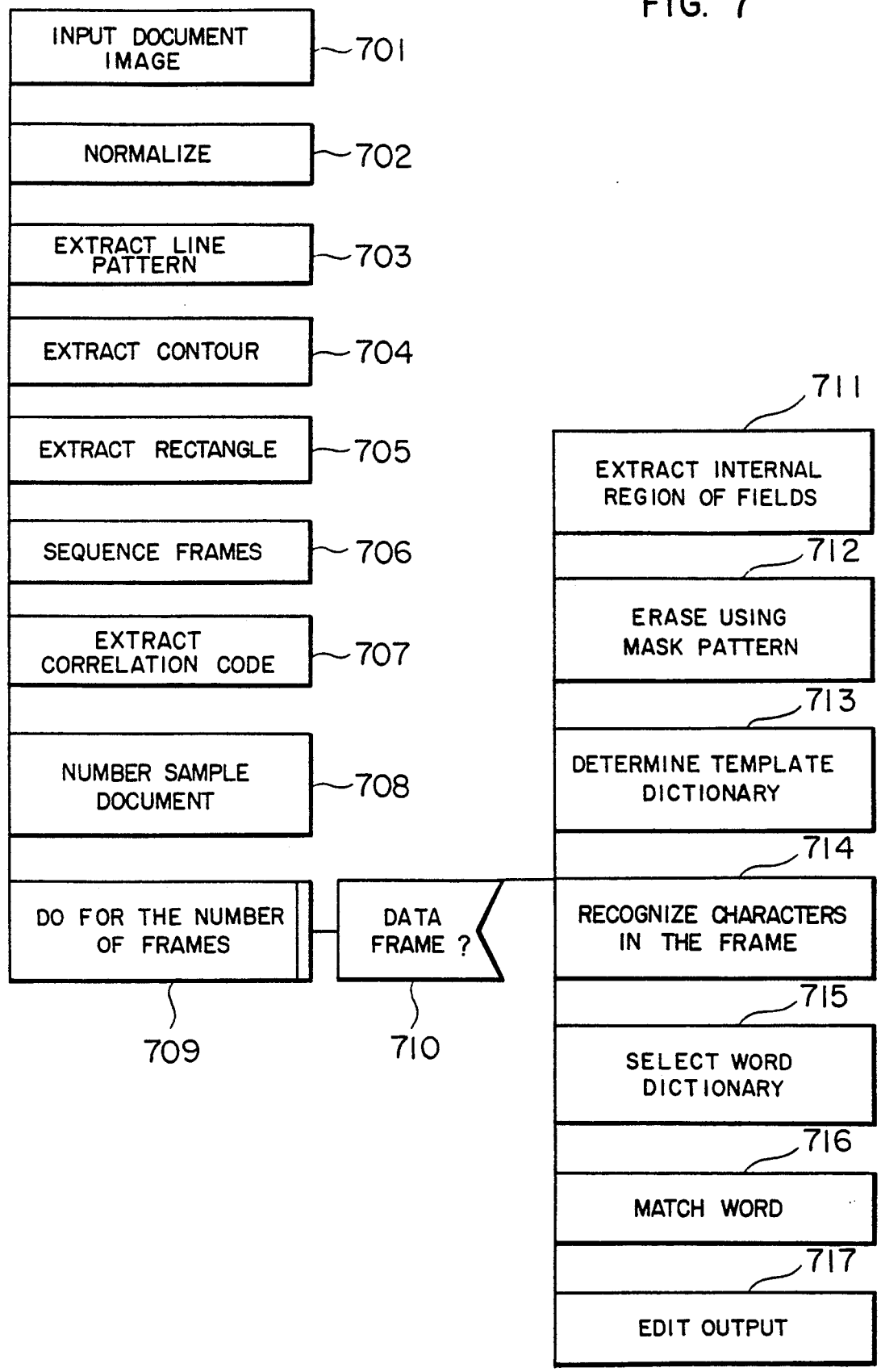

The processing of the document to be inputted in the recognition mode will now be explained. FIG. 7 shows a flow chart of the recognition mode processing. In a step 701, an input document image is read, in a step 702, it is normalized, in a step 703, a line pattern is extracted, in a step 704, a contour is extracted, in a step 705, a rectangle is extracted, in a step 706, the frames are sequenced, and in a step 707, correlation codes are extracted. Those steps correspond to the steps 202–207 of FIG. 2. In a step 708, structural data and physical data of the sample document are sequentially read from the memory 53 and they are compared with structural data and physical data of the input document stored in the memory 54 to determine the matching between the input document and the sample document. The input document is read in the following manner by using the structural data and the physical data of the sample document. A step 709 is an iterative loop for steps 710–717. In a step 710, a data frame is checked. Steps 711–717 are done only for data frames. In a step 711, the area in the data frame is extracted. In a step 712, the printed characters are erased by a mask pattern (only when the mask pattern is present). This processing is done by generating an image of the same size as the frame, clearing the image by filling 0's in all picture elements and filling 1's in the picture elements included inside the rectangle corresponding to the mask pattern. In a step 714, the character set designated by the property code is selected and a template dictionary (a set of standard patterns for character recognition) is set. In a step 714, characters in the frame are recognized. In a step 715, a word dictionary designated by the property code is selected. In a step 716, words are compared to correct a substitution error or a rejection error. In a step 717, the recognized characters and a necessary portion of the structural data are edited and the edited data are outputted to the output device 9. For example, if the item name of the item frame to which the data frame belongs is "applicant" (the rule on format 2 in the above example) and the recognition result for the frame is "Taro Yamada", the edit result is "applicant"="Taro Yamada" and it is written as one record. If the item name is "date", the unit name is "year-month-day" (the knowledge 4 in the above example) and the recognition result is 83529 because the unit name is erased by the mask data, the edit output is "day-time date"="May 29, 1983". In the latter case, the coordinates of the characters are read from the recognition unit 8 and compared with the mask pattern to determine the positions.

The embodiment of the present invention has thus been described. In the present embodiment, the processings carried out in the conventional character recognition apparatus or the pattern recognition apparatus such as display and correction of the extracted frames and display and correction of the recognized characters may be added. In recognizing the frame, a plurality of thresholds for extracting the lines or rectangles may be set and an optimum value may be selected in a man-machine communication if automatic selection is difficult or the retry may be carried out with a different quantization threshold. If the type of document is known in the recognition mode, the sample document number may be entered by the keyboard and the comparison of the structural data may be omitted.

In the present embodiment, the line pattern is extracted from the document and the frame is extracted from the line pattern. Alternatively, the contour may be directly extracted from the original document pattern and the frame may be extracted therefrom. In this case, the contour other than the frame may be subsequently utilized for other processing such as character segmentation or character recognition.

In the present embodiment, the document structure is limited to the frame structure. Alternatively, it may be expanded to ruled lines such as solid lines or broken lines or circles. For example, the solid ruled line may be detected by extracting an elongated outer contour, and underscored title characters can be recognized by extracting an area above the ruled line. The circle can be detected by representing a sequence of contour points by a polar coordinate system.

The characters outside of the frame may be read and utilized to describe the structure. Color information may be utilized to and color property to the structure description.

The document image need not be directly photo-electrically converted but it may be read from an image file.

Figure 8:
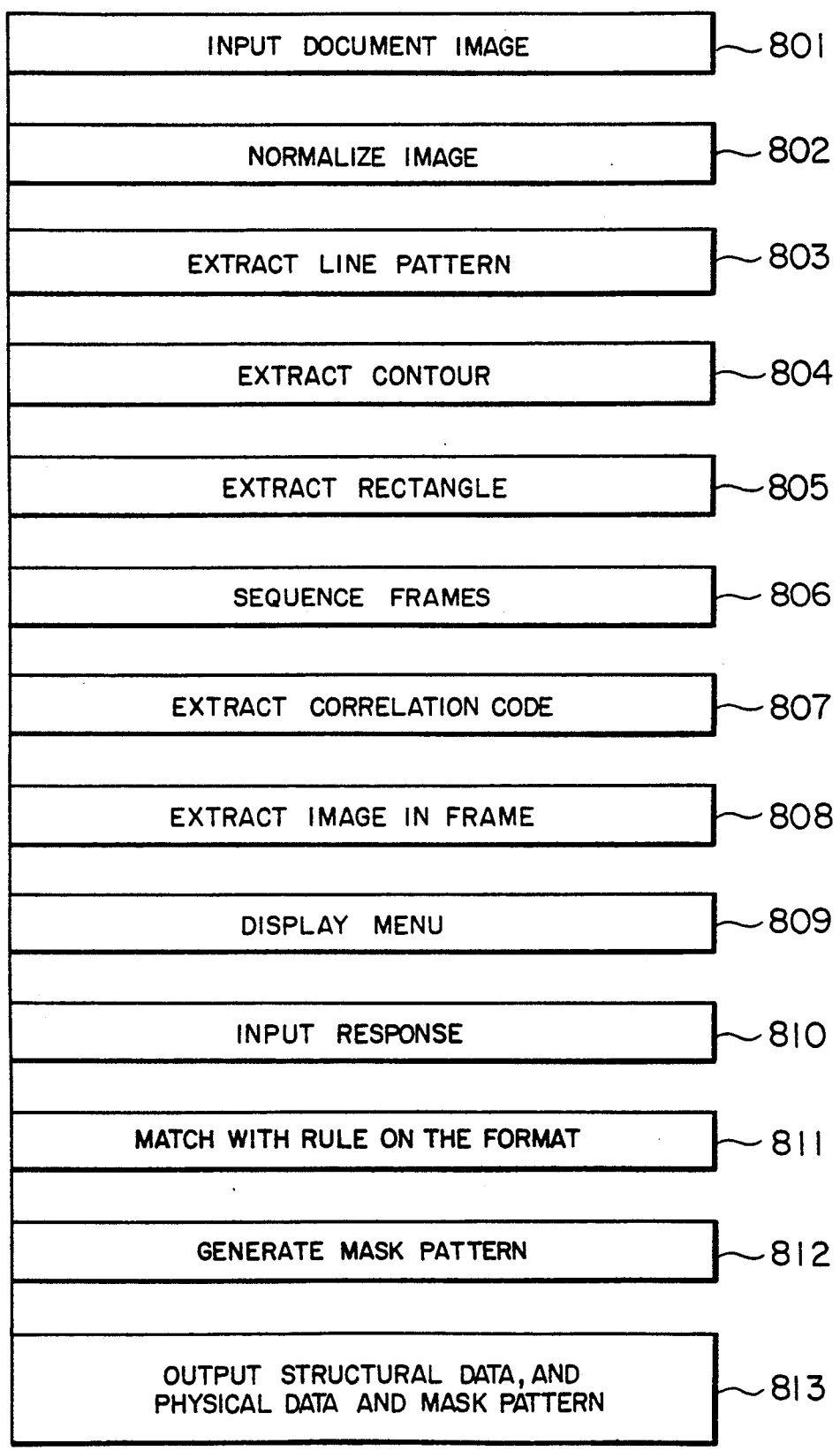
FIG. 8 is a flow chart for illustrating processing in a second embodiment of the present invention.

A second embodiment of the present invention will now be explained. The second embodiment differes from the first embodiment in the registration mode. FIG. 8 shows a flow chart of the registration mode processing. It is executed by a computer program in the control unit 2. In FIG. 8, the sample document image is inputted in a step 801, it is normalized in a step 802, a line pattern is extracted in a step 803, a contour is extracted in a step 804, a rectangle is extracted in a step 805, frames are sequenced in a step 806, and a correlation code is extracted in a step 807. Those steps correspond to the steps 201–207 in FIG. 2. In a step 808, images corresponding to the extracted frames are read from the original image and sequentially displayed on the display 7. In a step 809, a menu on the properties of the frames is displayed on the display 7. In a step 810, a response of a user to the menu is entered by the keyboard. The nature of the frame include a type of frame (item frame or data frame), and property (blank, name of person, name of location, date, name of article, human relation, etc.). The menu display of property and the response entry are done only for the item frame. The item name for the item frame is entered by the keyboard as a character code. If a frame is detected which does not contain anything, the blank frame may be automatically determined as a data frame. In a step 811, the attribute Am of the frame m, the item name Dm of the frame m and the frame correlation code Cmn are compared with the rule on the format on the structure of the document to recognize the structure of the input document. The rule on the format is expressed by "if∼- then∼", that is, by premises and conclusion. Examples of the rule on the format are shown below, in which a, b and c indicate the frame numbers.

| | | |
|---|---|---|
| 1. (Premises) | Aa = "Name of person " & frame a is an item frame. | |
| (Conclusion) | Property of frame a = "name of person" Item name of frame a = Da | |
| 2. (Premises) | Aa = "blank"& Ab = "name of person" & Cab = −3 | |
| (Conclusion) | Frame a is a data frame dependent on frame b. Property of frame a = "name of person" Item name of frame a = Db | |
| 3. (Premises) | Aa = "blank" & Ab = "name of location" & Cab = −4 Ac = "name of location" & Cac = −3 | |
| (Conclusion) | Frame a is a data frame dependent on frames b and sd,8 c. Property of frame a = "name of location" Item name of frame a = Db + Dc | |
| 4. (Premises) | Aa = "year-month-day" | |
| (Conclusion) | Frame a is an independent data frame Property of frame a = "time: year-month-day" Item name of frame a = Da | |
| 5. (Premises) | Aa = "blank" | |
| (Conclusion) | Frame a is an independent data frame. Item name of frame a = "miscellaneous" Property of frame a = "miscellaneous" | |

The property of the data frame is automatically determined by the item frame to which it belongs.

The implementation of the rule on the format is similar to that of the first embodiment. In a step 812, mask pattern is generated by, for example, extracting continuous black pixel regions in the frame and determining an outermost rectangle of a sufficiently large continuous black pixel region. In a step 813, structural data, physical data of the frame and mask data are sent to the output device 9. The registration mode has thus been described. The recognition mode is identical to that in the first embodiment.

We claim:

1. A method for analyzing document image data in a document processing system including a photo-electric converter unit, a recognition unit, a memory unit and a control unit, comprising the steps, performed by said document processing system, of:

converting, by said photo-electric converter unit, an input image on a document to digital image data, said input image including characters and line patterns having vertical and horizontal lines forming a plurality of rectangular areas surrounded by said vertical and horizontal lines, said rectangular areas comprising a plurality of items areas each including at least one word and a plurality of empty areas for writing therein character data;

extracting, by said control unit, from said digital image data a plurality of sets of frame data for defining said rectangular areas, and correlating said plurality of sets of frame data;

recognizing, by said recognition unit, strings of characters which form said words within said rectangular areas defined by said frame data;

producing, by said control unit, data for indicating logical correlations among said empty areas and said item areas on the basis of relationships among said plurality of sets of frame data and said recognized words in said rectangular areas; and storing, in said memory unit, said plurality sets of frame data, said logical correlation data among said empty areas and item areas, and said recognized words as analyzed data of said document.

2. A method for analyzing document image data in a document processing system including a photo-electric converter unit, a recognition unit, a memory unit and a control unit, comprising the steps, performed by said document processing system, of:

converting, by said photo-electric converter unit, an input image on a document to digital image data, said input image including characters and line patterns forming a plurality of rectangular areas, said rectangular areas comprising a plurality of item areas each including at least one word and a plurality of empty areas for writing therein character data;

extracting, by said control unit, from said digital image data a plurality of sets of frame data for defining said rectangular areas, and correlating said plurality of sets of frame data;

recognizing, by said recognition unit, strings of characters which form said words within said rectangular areas defined by said frame data;

producing, by said control unit, data for indicating logical correlations among said empty areas and said item areas on the basis of relationships among said plurality of sets of frame data and said recognized words in said rectangular areas; and storing, in said memory unit, said plurality sets of frame data, said logical correlation data among said empty areas and item areas, and said recognized words as analyzed data of said document;

wherein attribute data for indicating kinds of characters allowed to be written in said respective empty areas are produced in said producing step, and said attribute data are stored as at part of said analyzed data in said storing step.

3. A method for analyzing document image data according to claim 1, wherein said analyzed data of said document are stored with an identification code of said document in a memory means for storing document format data.

4. A system for processing document image data comprising:

first means for converting an input image on a document to digital image data, said input image including characters and line patterns having vertical and horizontal lines forming a plurality of rectangular areas surrounded by said vertical and horizontal lines, said rectangular areas comprising a plurality of item areas each including at least one word and a plurality of empty areas for writing therein character data;

second means for extracting from said digital image data a plurality of sets of frame data for defining said rectangular areas, and for correlating said plurality of sets of frame data;

third means for recognizing strings of characters in said digital image data, said character strings forming said words within said rectangular areas defined by said frame data;

fourth means for producing data for indicating logical correlations among said empty areas and said item areas on the basis of relationships among said plurality of sets of frame data and said recognized words in said rectangular areas; and fifth means for storing said plurality sets of frame data, said logical correlation data among said empty areas and item areas, and said recognized words as analyzed data of said document.

5. A system for processing document image data comprising:

first means for converting an input image on a document to digital image data, said input image including characters and line patterns forming a plurality of rectangular areas, said rectangular areas comprising a plurality of item areas each including at least one word and a plurality of empty areas for writing therein character data;

second means for extracting from said digital image data a plurality of sets of frame data for defining said rectangular areas, and for correlating said plurality of sets of frame data;

third means for recognizing strings of characters in said digital image data, said character strings forming said words within said rectangular areas defined by said frame data;

fourth means for producing data for indicating logical correlations among said empty areas and said item areas on the basis of relationships among said plurality of sets of frame data and said recognized words in said rectangular areas; and fifth means for storing said plurality sets of frame data, said logical correlation data among said empty areas and item areas, and said recognized words as analyzed data of said document;

wherein said fourth means including means for producing attribute data for indicating kinds of characters allowed to be written in said respective empty areas, and said fifth means storing said attribute data as a part of said analyzed data.

6. A system for processing document image data according to claim 4, further comprising means for designating an identification code of said input document, and said fifth means storing said analyzed data of said document with said designated identification code of said document.

7. A method for analyzing document image data in a document processing system including a recognition unit, a memory unit and a control unit, comprising the steps, performed by said document processing system of:

preparing, in said memory unit, digital image data of a document including characters and line patterns having vertical and horizontal lines forming a plurality of rectangular areas surrounded by said vertical and horizontal lines, said rectangular areas comprising a plurality of item areas each including at least one word and a plurality of empty areas for writing therein character data;

extracting, by said control unit, from said digital image data a plurality of sets of frame data for defining said rectangular areas, and correlating said plurality of sets of frame data;

recognizing, by said recognition unit, strings of characters which form said words within said rectangular areas defined by said frame data;

producing, by said control unit, data for indicating logical correlations among said empty areas and said item areas on the basis of relationships among said plurality of sets of frame data and said recognized words in said rectangular areas; and storing, in said memory unit, said plurality sets of frame data, said logical correlation data among said empty areas and item areas, and said recognized words as analyzed data of said document.

8. A method for analyzing document image data in a document processing system including a recognition unit, a memory unit and a control unit, comprising the steps, performed by said document processing system, of:

preparing, in said memory unit, digital image data of a document including characters and line patterns forming a plurality of rectangular areas, said rectangular areas comprising a plurality of item areas each including at least one word and a plurality of empty areas for writing therein character data;

extracting, by said control unit, from said digital image data a plurality of sets of frame data for defining said rectangular areas, and correlating said plurality of sets of frame data;

recognizing, by said recognition unit, strings of characters which form said words within said rectangular areas defined by said frame data;

producing, by said control unit, data for indicating logical correlations among said empty areas and said item areas on the basis of relationships among said plurality of sets of frame data and said recognized words in said rectangular areas; and storing, in said memory unit, said plurality sets of frame data, said logical correlation data among said empty areas and item areas, and said recognized words as analyzed data of said document;

wherein attribute data for indicating kinds of characters allowed to be written in said respective empty areas are produced in said producing step, and said attribute data are stored as at part of said analyzed data in said storing step.

9. A method for analyzing document image data according to claim 7, wherein said analyzed data of said document are stored with an identification code of said document in a memory means for storing document format data.

10. A system for processing document image data comprising:

means for storing digital image data of a document including characters and line patterns having vertical and horizontal lines forming a plurality of rectangular areas surrounded by said vertical and horizontal lines, said rectangular areas comprising a plurality of item areas each including at least one word and a plurality of empty areas for writing therein character data;

means for extracting from said digital image data a plurality of sets of frame data defining said rectangular areas and for correlating said plurality of sets of frame data;

means for storing said plurality of sets of frame data, said logical correlation data among said empty areas and item areas, and said recognized words as analyzed data of said document.

11. A system for processing document image data comprising:

means for storing digital image data of a document including characters and line patterns forming a plurality of rectangular areas, said rectangular areas comprising a plurality of item areas each including at least one word and a plurality of empty areas for writing therein character data;

means for extracting from said digital image data a plurality of sets of frame data defining said rectangular areas and for correlating said plurality of sets of frame data;

means for recognizing strings of characters in said digital image data, said character strings forming said words within said rectangular areas defined by said frame data;

means for producing data for indicating logical correlations among said empty areas and said item areas on the basis of relationships among said plurality of sets of frame data and said recognized words in said rectangular areas; and means for storing said plurality of sets of frame data, said logical correlation data among said empty areas and item areas, and said recognized words as analyzed data of said document;

wherein said producing means includes means for producing attribute data indicating kinds of characters allowed to be written in said respective empty areas, and said analyzed data includes said attribute data.

12. A system for processing document image data according to claim 10, further comprising means for designating an identification code of said input document, and said analyzed data of said document are stored with said designated identification code of said document.

13. A method for analyzing document image data in a document processing system including a recognition unit, a memory unit and a control unit, comprising the steps, performed by said document processing system, of:

preparing, in said memory unit, digital image data of a document including characters and line patterns having vertical and horizontal lines forming a plurality of rectangular areas surrounded by said vertical and horizontal lines, said rectangular areas comprising a plurality of item areas each including at least one word comprising a string of characters and a plurality of data areas for writing therein character data;

extracting, by said control unit, from said digital image data a plurality of sets of frame data for defining said rectangular areas, and correlating said plurality of sets of frame data;

recognizing, by said recognition unit, characters, a part of which form said words within said rectangular areas defined by said frame data;

producing, by said control unit, data for indicating logical correlations among said data areas and said item areas on the basis of relationships among said plurality of sets of frame data, said logical correlation data among said data areas and item areas, and said recognized words as analyzed data of said document.

14. A method for analyzing document image data in a document processing system including a recognition unit, a memory unit and a control unit, comprising the steps, performed by said document processing system, of:

preparing, in said memory unit, digital image data of a document including characters and line patterns forming a plurality of rectangular areas, said rectangular areas comprising a plurality of item areas each including at least one word comprising a string of characters and a plurality of data areas for writing therein character data;

extracting, by said control unit, from said digital image data a plurality of sets of frame data for defining said rectangular areas, and correlating said plurality of sets of frame data;

recognizing, by said recognition unit, characters, a part of which form said words within said rectangular areas defined by said frame data;

producing, by said control unit, data for indicating logical correlations among said data areas and said item areas on the basis of relationships among said plurality of sets of frame data, said logical correlation data among said data areas and item areas, and said recognized words an analyzed data of said document;

wherein attribute data for indicating kinds of characters allowed to be written in said respective data areas are produced in said producing step, and said attribute data are stored as at part of said analyzed data in said storing step.

15. A method for analyzing document image data according to claim 13, wherein said analyzed data of said document are stored with an identification code of said document in a memory means for storing document format data.

* * * * *